(12) United States Patent
Carlson et al.

(10) Patent No.: US 6,405,363 B1
(45) Date of Patent: Jun. 11, 2002

(54) CLASS CASTING SUPPORT FOR RUN-TIME EXTENSIBLE ITEMS IN AN OBJECT ORIENTED FRAMEWORK

(75) Inventors: Brent A. Carlson; Timothy J. Graser, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/139,141

(22) Filed: Aug. 24, 1998

Related U.S. Application Data (63) Continuation-in-part of application No. 09/038,024, filed on Mar. 11, 1998.

(51) Int. Cl.$^7$ ................................................ G06F 9/44
(52) U.S. Cl. ........................ 717/100; 717/108; 717/116; 709/332
(58) Field of Search ............................... 395/701; 707/6, 707/103 R; 717/1, 120, 101–109, 162–166, 110–119; 709/332

(56) References Cited

U.S. PATENT DOCUMENTS

| | | | |
|---|---|---|---|
| 5,671,360 A | * 9/1997 | Hambrick et al. | 705/9 |
| 5,787,283 A | * 7/1998 | Chin et al. | 717/101 |
| 5,787,425 A | * 7/1998 | Bigus | 707/6 |
| 5,937,189 A | * 8/1999 | Branson et al. | 717/101 |

OTHER PUBLICATIONS

Flanagan, Java in a Nutshell, May 1997, O'Reilly, 2nd Edition, pp. 3–13, 49–82.*
IBM Bean Extender, Bean Extender Guide to Features: The Dipping Framework, http://www.alphaworks.ibm.com/formula/beanextender/, Dec. 1997.*
IBM Technical Disclosure Bulletin, Hardware Assistance for Type Checking, May 1976.*
IBM Technical Disclosure Bulletin, Global Context Functions in Object–oriented Environments, Aug. 1993.*
IBM Technical Disclosure Bulletin, Reusable Object Oriented Framework for Plug Compatible Applications, Mar. 1995.*
Eckel, Thinking in Java, Prentice Hall Inc, Jan. 1998.*

* cited by examiner

*Primary Examiner*—Gregory A. Morse
*Assistant Examiner*—Hoang-Vu Antony Nguyen-Ba
(74) *Attorney, Agent, or Firm*—Martin & Associates, L.L.C.; Derek P. Martin (57) ABSTRACT

In an object oriented computer system, a framework mechanism defines one or more run-time extensible items that may be dynamically reconfigured as required to support different interfaces at run-time. Each extensible item has one or more adapters that correspond to the extensions owned by the extensible item. The extensible item class defines a castTo( ) method. The castTo( ) method is invoked to logically cast an instance of the extensible item class to a desired class so that a selected method on that class can be called. When the castTo( ) method is invoked on an instance of the extensible item class, the extensible item object determines if any of its extensions have an adapter that supports the class specified in the castTo( ) method call. If an adapter does support the specified class, the adapter corresponding is returned, and the selected method is then invoked on the adapter. In this manner, class casting of run-time extensible items is achieved.

15 Claims, 7 Drawing Sheets

CLASS CASTING SUPPORT FOR RUN-TIME EXTENSIBLE ITEMS IN AN OBJECT ORIENTED FRAMEWORK

REFERENCE TO PARENT APPLICATION

This application is a Continuation-In-Part of "A Method of Developing a Software System Using Object Oriented Technology", U.S. Ser. No. 09/038,024, filed Mar. 11, 1998, which is incorporated herein by reference.

BACKGROUND OF THE INVENTION

1. Technical Field

This invention generally relates to object oriented programming and more specifically relates to a mechanism and method for supporting class casting of run-time extensible items in an object oriented framework.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to write a particular software program, such as a software application. One framework that is commercially available from IBM is known as San Francisco, which provides pre-defined classes that allow a user to easily extend the framework to define a custom software application, such as a general ledger or an order processing system. San Francisco defines a special type of domain-neutral object mechanism referred to herein as an extensible item. An extensible item can be dynamically reconfigured at run-time by adding or deleting domain-specific extensions to the extensible item object. An extensible item that holds a particular primary extension logically becomes an object of the type defined by the primary extension, thereby becoming domain-specific. In this manner the extensible item, which is domain-neutral, can acquire domain-specific extensions that define behavior that allows the extensible item to function as though it were domain-specific itself, although access to this function without the casting support described herein is through generic means.

Many object oriented programming languages, such as C++ and Java, provide type casting support. Type casting of classes allows a concrete subclass to inherit from more than one parent class, and if an instance of the subclass only needs to support one of the parent classes at run-time, the object can be "cast to" the desired parent class, thereby making the instance support only the desired parent class. The concept of class casting in a traditional object oriented programming environment, where classes statically inherit from each other at compile-time, is well known to one skilled in the art. However, there is currently no known way to provide class casting support for run-time extensible items, such as those defined by IBM's San Francisco framework. Casting allows access to domain function in a domain-specific manner. Without a way to make run-time extensible items support class casting, the powerful concept of casting will be unavailable for run-time extensible items.

DISCLOSURE OF INVENTION

In an object oriented computer system, a framework mechanism defines one or more run-time extensible items that may be dynamically reconfigured as required to support different interfaces at run-time. The behavior associated with these interfaces is supported by one or more extensions owned by the extensible item. Each extensible item has one or more adapters that correspond to the extensions owned by the extensible item. The extensible item class defines a castTo( ) method. The castTo( ) method is invoked to logically cast an instance of the extensible item class to a desired class so that a selected method on that class can be called explicitly rather than by directly invoking the method provided by the extensible item. When the castTo( ) method is invoked on an instance of the extensible item class, the extensible item object determines if any of its extensions have an adapter that supports the class specified in the castTo( ) method call. If an adapter does support the specified class, the adapter corresponding is returned, and the selected method can then be invoked on the adapter. In this manner, class casting of run-time extensible items is achieved.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

There is, as yet, no uniformly accepted notation for communicating object-oriented programming ideas. The notation used in this specification is very similar to that known in the programming industry as Booch notation, after Grady Booch, Mr. Booch is the author of Object-Oriented Analysis and design With Applications, 2nd ed. (1994), available from the Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below.

Figure 2:
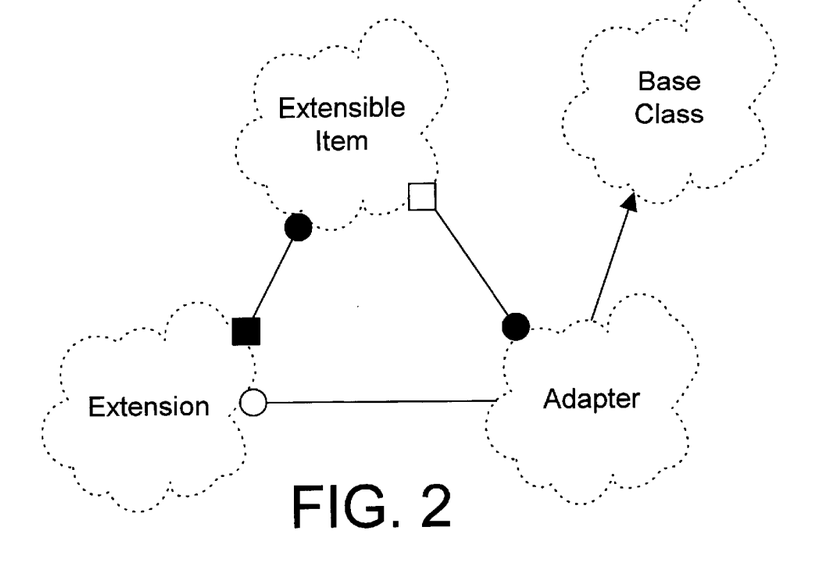
FIG. 2 is a class diagram of an extensible item and its related classes.

A system that is modeled by an object-oriented framework can be represented at a high level of abstraction by a diagram called a class diagram. FIG. 2 of the drawings is an example of a class diagram containing representations of abstractions of the modeled system. The system abstractions include classes and objects. Details of the system classes are provided in the class diagram that is used to indicate the relationships and responsibilities of the classes. A class is represented by an irregularly shaped, dashed-line icon commonly referred to as a cloud. FIG. 2, for example, shows several classes represented as clouds. Each class is identified by a name that is unique to the associated class. Within a class icon, the class name is listed above any listed attribute names, operation names followed by parentheses, and constraints that are enclosed within brackets.

Figure 7:
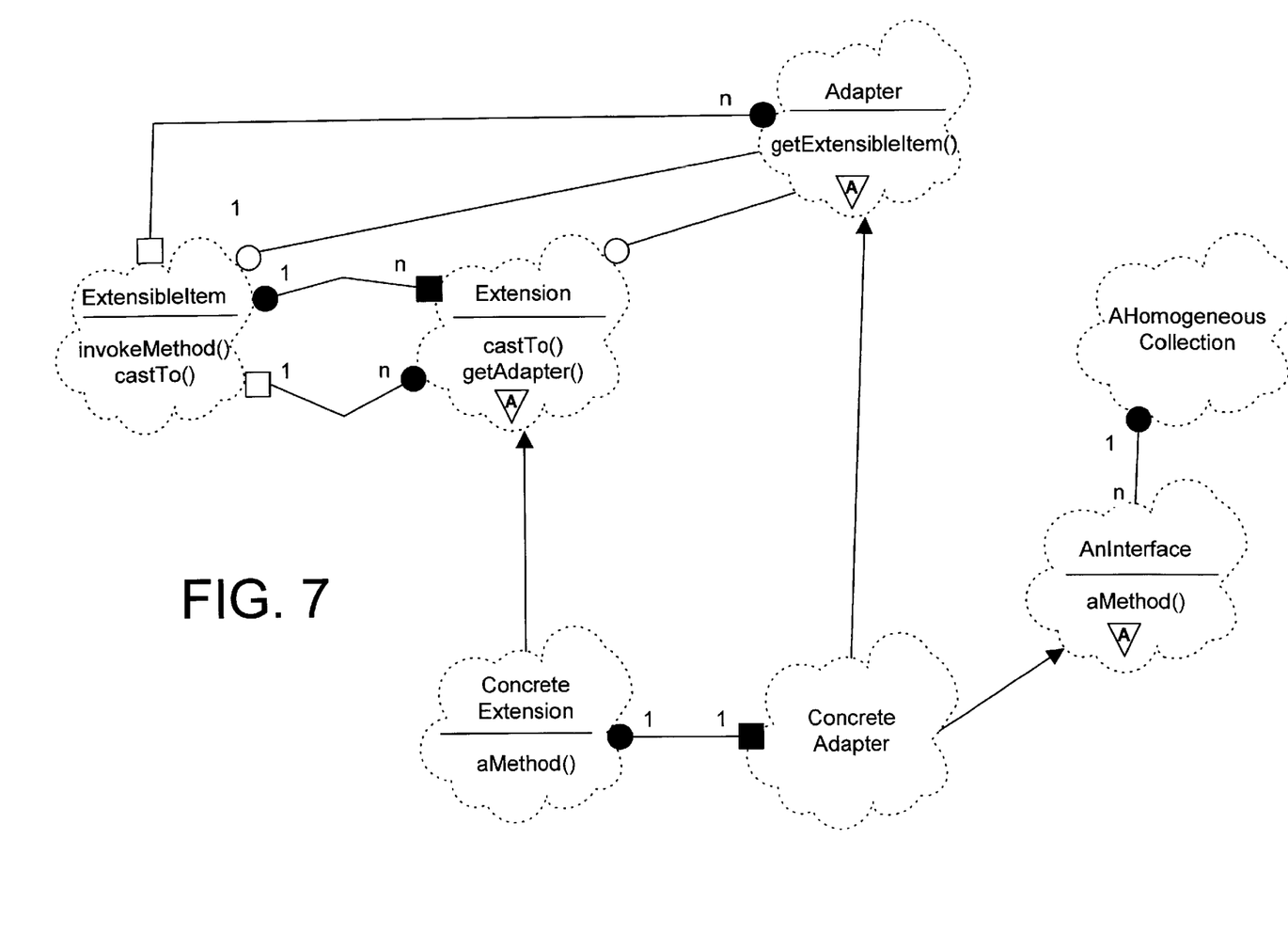
FIG. 7 is a class diagram showing an implementation in accordance with a preferred embodiment of the present invention.

Connecting lines between classes indicate the nature of the relationships between such respective classes. Thus, connections between the classes in FIG. 7 represent relationships between the various mechanisms. A straight connecting line, for example, represents a simple association relationship indicating shared information. A "using" relationship is a refinement of a simple association whereby one class that is referred to as a server or supplier provides services to another class that is referred to as a client. Such a relationship is indicated by an open circle at one end of a simple association line, the open circle end designating the client that "uses" the associated server class.

Another refinement of a simple association between classes is a "containment" relationship whereby one class "contains" another class. This containment association is also referred to as a "has a" relationship, because one class "has" instances of another class. The containment relationship is indicated by a closed circle at one end of a simple association line, the circle end designating the client that "has" the associated other class. Note that the opposite end of the containment relationship line may also have symbols that give further details of the containment relationship. A solid square indicates that the contained class is contained directly within the containing class, which is also known as a "contains by value" relationship. An open square indicates that the contained class is not contained directly, but references to the contained class are contained within the containing class. This relationship is known as a "contains by reference" relationship.

Yet another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be subclass of B and B is said to be a superclass or parent of A. That is, A "is a" B. An inheritance relationship is denoted with a connecting line that includes an arrowhead at one end to indicate a subclass that derives its characteristics from a parent class pointed to by the arrowhead.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiation comprising lions, tigers, and bears. An instantiation of a class represented by a dashed association line with an arrowhead pointing from an instance of a class to the general class.

Properties of classes can be represented by class adornments that are enclosed within the class cloud icon. In particular, an abstract class is denoted by an upper class block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is an entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams (such as FIGS. 8 and 9) that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of messages transfer is indicated by adorning a simple connecting line with an arrowhead that points from an object that invokes an operation, referred to as the client object, to the object that provides the operation, referred to as the server object. Such a representation of a simple synchronization relationship denotes the simplest form of message-passing. Such an association can indicate, for example, the invocation of an operation. Operation parameters can be indicated adjacent the linking line.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

The Term Framework

There has been an evolution of terms and phrases which have particular meaning to those skilled in the art of Object Oriented (OO) design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OP framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well-defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IBM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An object may have a primary extension, and one or more additional extensions. An object with a primary extension logically becomes an object of the type defined by the primary extension. Thus, if an object has a primary extension OrderDetail, the object logically appears to be a member of the OrderDetail class. This ability to dynamically modify the behavior of objects at run-time is one of the powerful concepts supported in the San Francisco framework.

The class diagram of FIG. 2 illustrates the concept of dynamic run-time extensions in the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The Extension class has the ability to create or delete one or more adapter objects that are instances of an Adapter class. The Extension class has a "using" relationship with the Adapter class, while the Adapter class has a "has" relationship with the ExtensibleItem class. The Adapter class inherits from a BaseClass that defines domain-specific behavior. The BaseClass defines a formal interface for the domain behavior that objects of the Extension class add to an ExtensibleItem object. The Adapter class is provided to allow an ExtensibleItem object owning an object of the given Extension class to be treated as a true instance of the BaseClass.

Figure 3:
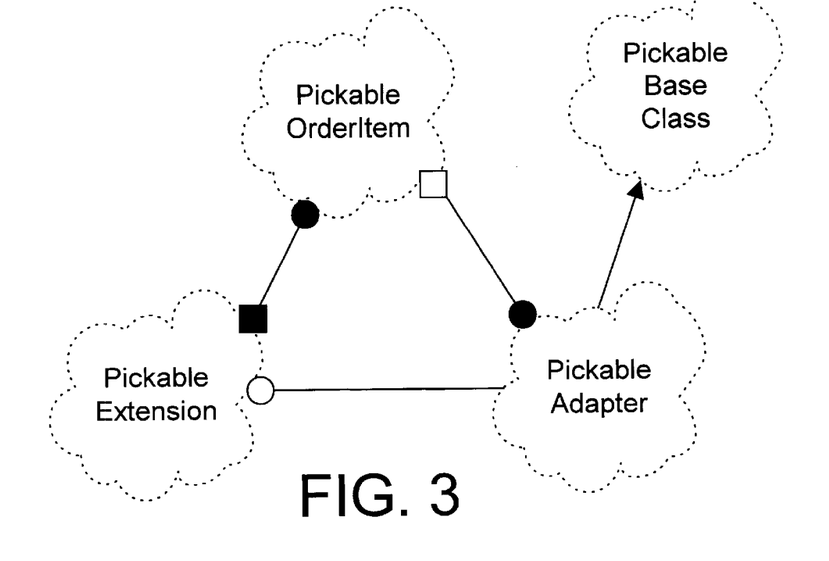
FIG. 3 is a class diagram of one specific example of an extensible item.

A specific example helps to illustrate the concepts of domain-specific extensions to a domain-neutral object. Let's assume there is a need for a "pickable" order item. Referring to FIG. 3, a PickableOrderItem class represents a domain-neutral extensible item, and includes an instance of a PickableExtension class, which extends the PickableOrderItem for use in a specific domain that requires objects that are pickable. A PickableAdapter class has a reference to the PickableOrderItem class, and supports the interface of the PickableBaseClass. The class configuration of FIG. 2, as illustrated in the specific example of FIG. 3, allows extensions to be dynamically added to and deleted from an extensible item object as the desired function of the object changes.

Figure 4:
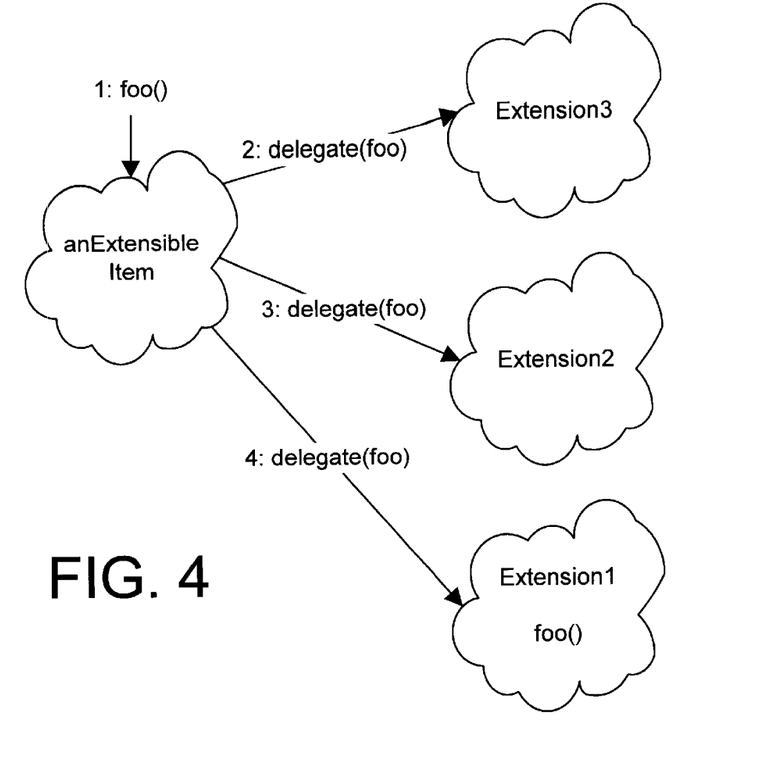
FIG. 4 is an object diagram illustrating the delegation of method calls to extension objects.

An instance of the ExtensibleItem class can service method calls in a number of different ways. Referring to FIG. 4, an instance anExtensibleItem has three associated extensions, Extension3, Extension2, and Extension1. One way for anExtensibleItem to service a method call is to determine which extension can handle the method call, progressing from the newest (Extension3) to the oldest (Extension1 ). For example, we assume that Extension1 supports a method called "foo", and that"foo" is invoked on anExtensibleItem (step 1). The anExtensibleItem object first delegates the "foo" method to Extension3 (step 2). Extension3 does not support the method, so anExtensibleItem delegates the call to "foo" to the next extension, Extension2 (step 3). Extension2 does not support the "foo" method, so anExtensibleItem delegates the call to "foo" to Extensions (step 4). Extension1 supports "foo", so Extension1 executes its "foo" method in response to anExtensibleItem delegating "foo" to Extension1 in step 4. Note that the first extension to support the "foo" method will execute its "foo", and other implementations of"foo" in older extensions are therefore not available. This is one way of hiding a method on existing extensions, by providing a newer extension that supports the method. In the alternative, an extension may change itself to fail when a specific method is requested, thereby hiding its own implementation of that method.

As the behavior of an ExtensibleItem is changed by adding or deleting extensions, the ExtensibleItem may have to interrogate several objects to determine the functions that its interface supports, as shown in FIG. 4. If a method is not supported, the ExtensibleItem may spend a significant amount of processing time to make this determination. Likewise, if a method is implemented in an older interface, the ExtensibleItem may have to unsuccessfully interrogate several extensions before finding one that supports the called method. To improve performance, a Dynamic Virtual Function Table (DVFT) is used to cache the interface information on the ExtensibleItem in a dynamic way. Thus, when a method is invoked, the ExtensibleItem can determine from its Dynamic Virtual Function Table whether the method is supported, and if so, by what extension. The Dynamic Virtual Function Table thus improves system performance by caching interface information in the ExtensibleItem itself.

The information in the Dynamic Virtual Function Table may be maintained either as extensions are added to or removed from the ExtensibleItem, or may be built as the extensions are used. In the latter case, as a method call is delegated to an extension for the first time, its methods are added to the Dynamic Virtual Function Table. This solution is dynamic by maintaining cached information as the extensions are added and removed from the ExtensionItem.

Figure 5:
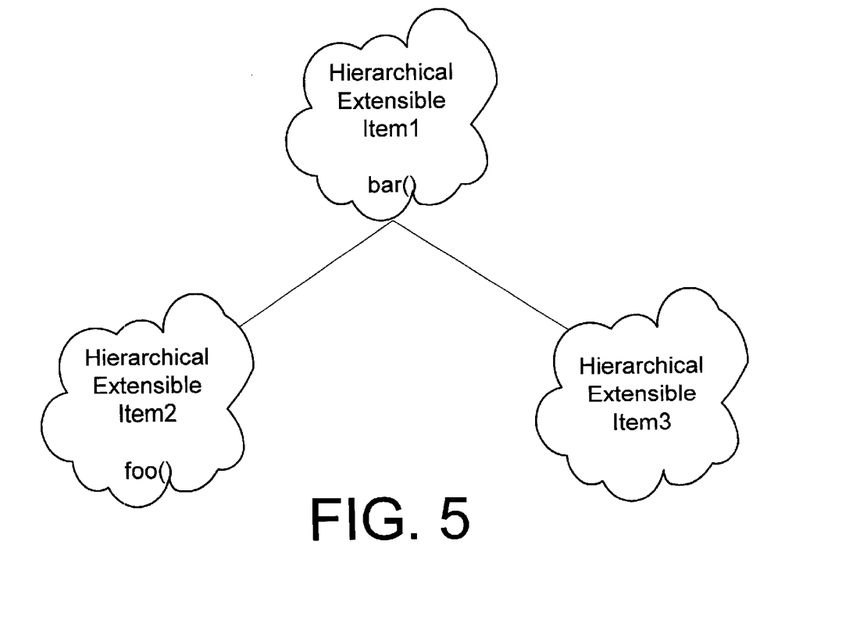
FIG. 5 is an object tree for illustrating the delegation of method calls to parent and children objects in an object tree.

If an ExtensibleItem object is part of a tree structure of objects, where it is attached to other ExtensibleItem objects as a parent and/or a child, the method call on one ExtensibleItem object may be delegated either upwards or downwards in the tree structure. For example, referring to FIG. 5, a very simple tree structure is provided to illustrate the delegation of method calls from one object in a tree structure to another. We assume that a class HierarchicalExtensibleItem is a subclass of ExtensibleItem that enhances ExtensibleItem by adding behavior to explicitly allow invoking methods in either a "drill up" or "drill down" fashion. HierarchicalExtensibleItem 1 is an instance of the HierarchicalExtensibleItem class and is at the top level of the tree, with two children objects HierarchicalExtensibleItem2 and HierarchicalExtensibleItem3 that are also instances of the HierarchicalExtensibleItem class. We assume that HierarchicalExtensibleItem1 supports the method "bar", and that HierarchicalExtensibleItem2 supports the method "foo". This means that these objects have one or more extensions that support these methods. In the case of "drill up", either method "foo" or "bar" could be invoked on HierarchicalExtensibleItem2. The invocation of the "foo" method on HierarchicalExtensibleItem2 delegates to the "foo" method on HierarchicalExtensibleItem2, while the invocation of "bar" delegates the "bar" up the tree (drill up) to HierarchicalExtensibleItem1. Invoking "foo" on HierarchicalExtensibleItem1 or HierarchicalExtensibleItem3 using "drill up" results in an error. When invoking a method using "drill down", if the method is found on a given HierarchicalExtensibleItem, the delegation will be to that method only, otherwise it will be invoked in "drill down" fashion (which may involve recursion) on all children of the given HierarchicalExtensibleItem, accumulating the results of the multiple method calls, if necessary. Thus, if "bar" is invoked on HierarchicalExtensibleItem1 using "drill down", it would delegate to the "bar" method on HierarchicalExtensibleItem1 and stop there. However, if "foo" were called on HierarchicalExtensibleItem1 using "drill down", the call would be delegated to "foo" on HierarchicalExtensibleItem2 and would then continue on to HierarchicalExtensibleItem3 (which would have no effect in the specific example of FIG. 5), and stop there. This concept of upwards and downwards delegation of method calls can be extended indefinitely throughout a tree structure of ExtensibleItems.

Extensible items thus provide a powerful and dynamic way to change the interface for an object at run-time so the object can acquire and tailor its domain-specific behavior as required. The concept of extensible items discussed above is the foundation upon which the present invention is built.

2. Detailed Description

According to a preferred embodiment of the present invention, a mechanism and method provide for supporting class casting of extensible items in an object oriented framework when a selected method on a particular class needs to be invoked. The extensible item includes a castTo( ) method that is invoked when the extensible item needs to be cast to a particular class. In response to invoking the castTo( ) method on an extensible item, an adapter object that corresponds to the extensible item is returned, and the selected method is invoked on the adapter object. The specific operations that support class casting are performed "under the covers", which means that, from the user's perspective, invoking a castTo( ) method on a run-time extensible item is semantically similar to casting an instance of a Java or C++ class that was statically extended at compile time.

Figure 1:
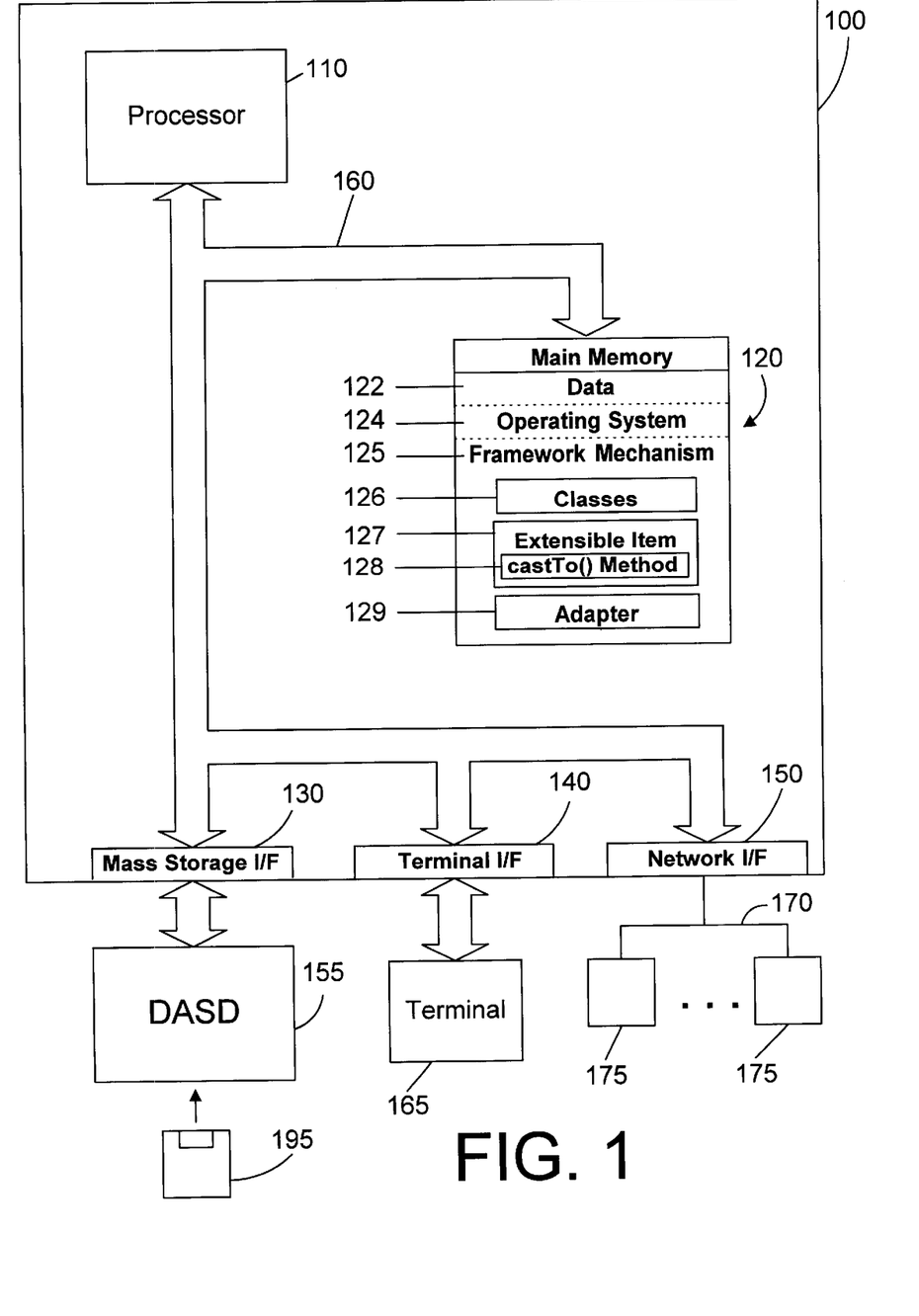
FIG. 1 is a block diagram of an apparatus in accordance with a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object oriented framework mechanism 125 in accordance with the preferred embodiments. Framework 125 includes multiple pre-defined classes 126, one or more extensible items 127, and one or more adapters 129. The extensible item 127 includes a castTo( ) method 128 that provides class casting support for the extensible item 127, which is dynamically extended at run-time by adding or deleting appropriate extension objects.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and framework mechanism 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Processor 110 may be constructed from one or more microprocessors and/or integrated circuits. Processor 110 executes program instructions stored in main memory 120.

Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 6:
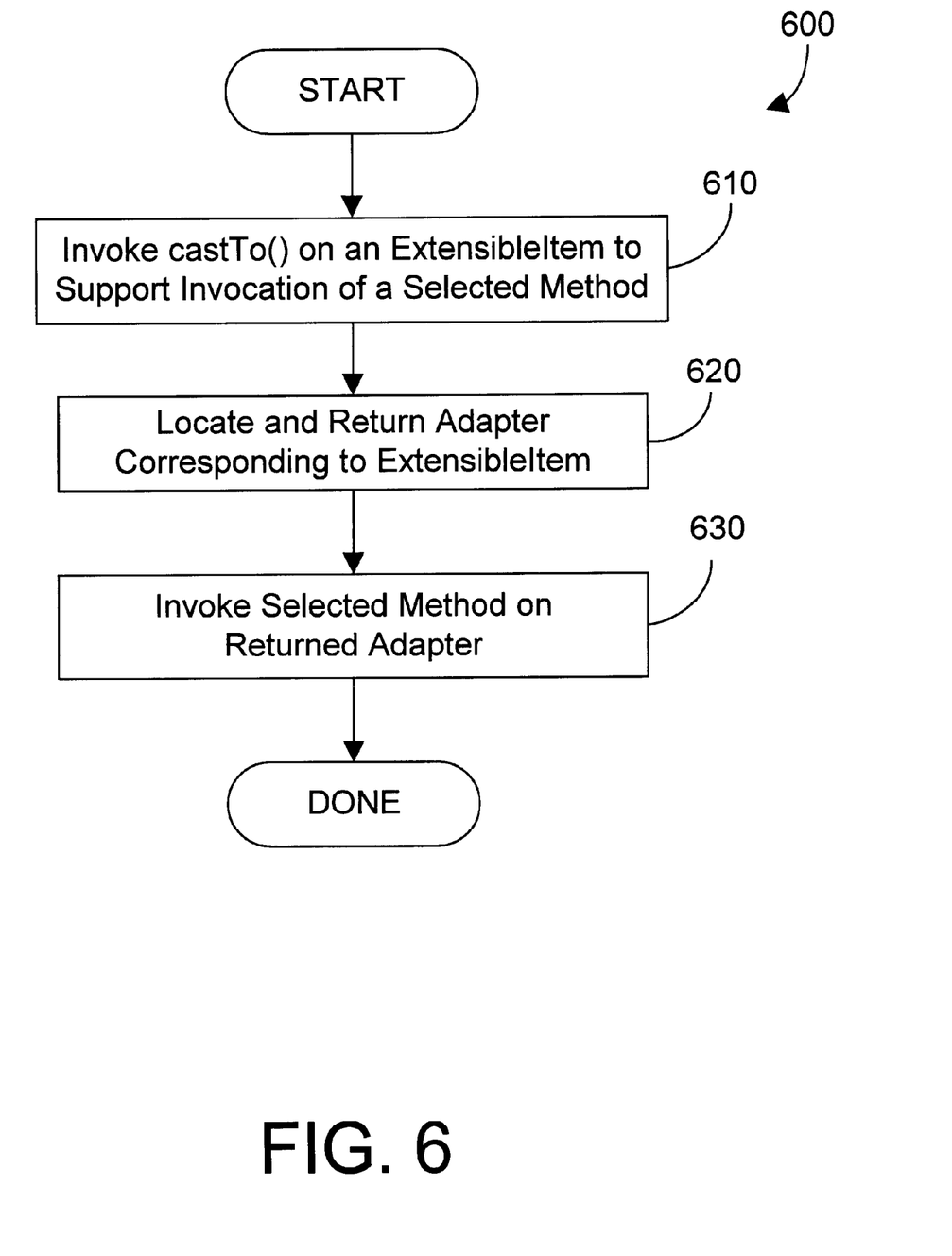
FIG. 6 is a flow diagram showing the steps in coupling processes within an object oriented framework mechanism in accordance with the preferred embodiments.

Referring to FIG. 6, a method 600 provides class casting support for run-time extensible items. Method 600 begins when a client program invokes the castTo( ) method on an extensible item object (step 610) to prepare the extensible item object for a selected method call. In response, an adapter that corresponds to the extensible item object is located and returned (step 620). Next, the selected method is invoked on the adapter object (step 630). Using method 600, a run-time extensible item object supports class casting in the same manner, from the viewpoint of the client program, as a class that is statically extended at compile-time. In the case of a dynamically extended extensible item, the standard casting mechanism provided by Java is insufficient because the client only has knowledge of the extensible item, which does not implement the domain interface of interest. The domain interface of interest is implemented by the adapter associated with an extension contained by the extensible item. The castTo( ) method returns the adapter to the client, thus giving the client an object against which the domain interface can be directly invoked, just as the Java casting mechanism enables this for statically extended Java classes.

Referring to FIG. 7, a class diagram represents many of the classes and class relationships in accordance with a preferred embodiment of the present invention. The ExtensibleItem class, Extension class, and Adapter class are the same classes shown in FIG. 2. In addition, the class AnInterface represents the BaseClass of FIG. 2. ExtensibleItem contains (or "owns") the Extension class, which means that the extensions are contained within and owned by the ExtensibleItem. In addition, the Extension class has a "contains by reference" relationship with the ExtensibleItem class, meaning that each Extension references an ExtensibleItem. These relationships between ExtensibleItem and Extension are what define that the ExtensibleItem "owns" its extensions. ExtensibleItem defines a castTo( ) method that is used to support class casting of an ExtensibleItem object. When the castTo( ) method is invoked, the name of the desired class is passed as a parameter. In addition, the ExtensibleItem defines an invokeMethod( ) method that is used to call a selected method on an ExtensibleItem object so that the ExtensibleItem object knows to delegate the method passed as a parameter to the invokeMethod( ) call to the appropriate concrete extension.

The Extension class is an abstract class that defines a castTo( ) method and a getAdapter( ) method. These methods are abstract, which means they are actually implemented in the ConcreteExtension subclass. The castTo( ) method is used to query each concrete extension to determine if the extension is associated with an adapter object that implements the class specified as the parameter. The getAdapter( ) method is invoked on each concrete extension to determine which adapter corresponds to the extension. The getAdapter( ) method is invoked when the castTo( ) method indicates that the concrete extension supports the desired class specified as a parameter to the castTo( ) method call. In addition, the ConcreteExtension class defines a method called aMethod( ), which is a representation of any method that is supported by any concrete extension to an ExtensibleItem. The method aMethod( ) is a method that may be invoked explicitly rather than via the ExtensibleItem's invokeMethod interface.

The ExtensibleItem class has a "using" relationship with the Adapter abstract class, which in turn has a "contains by reference" relationship with the ExtensibleItem class, representing that an Adapter has a reference to a corresponding ExtensibleItem. In addition, the Extension class has a "using" relationship with the adapter class, indicating that the Extension class may return an adapter object when the getAdapter( ) method is invoked.

The ConcreteAdapter class is a subclass of the Adapter class, and implements the interface of the AnInterface class. The ConcreteAdapter class implements the getExtensibleItem( ) method defined on its abstract Adapter parent class. In addition, the ConcreteAdapter class provides a concrete implementation of the aMethod( ) method defined on AnInterface, which is a general representation for any method on an interface that is supported by Concrete-Adapter. A class AHomogeneousCollection class represents a homogeneous collection of objects, such as pickable objects or shippable objects, and has a "has" relationship with the AnInterface class, indicating that the collection is made up of instances of AnInterface, whether they are instances of the ConcreteAdapter class or whether they are instances of some other Java class that implements the interface of the AnInterface class. Note that the method (such as aMethod( )) on the Adapter class does not necessarily have to be supported by a similarly-named method on the Extension class, because a method on the Adapter class can be routed to a suitable method of a different name on the Extension class.

Figure 8:
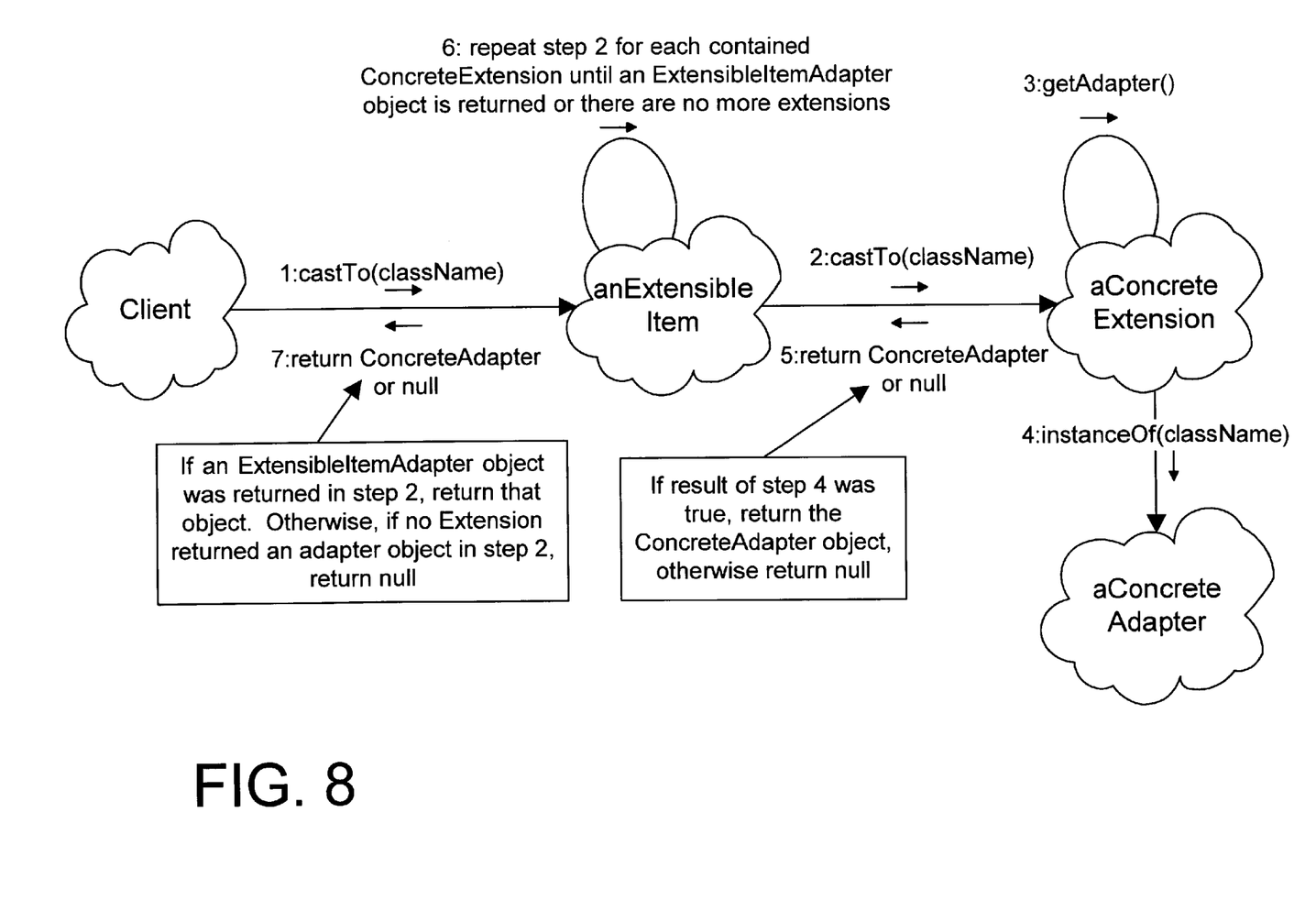
FIG. 8 is an object diagram showing steps to return an adapter when an ExtensibleItem is cast to a particular class.
Figure 9:
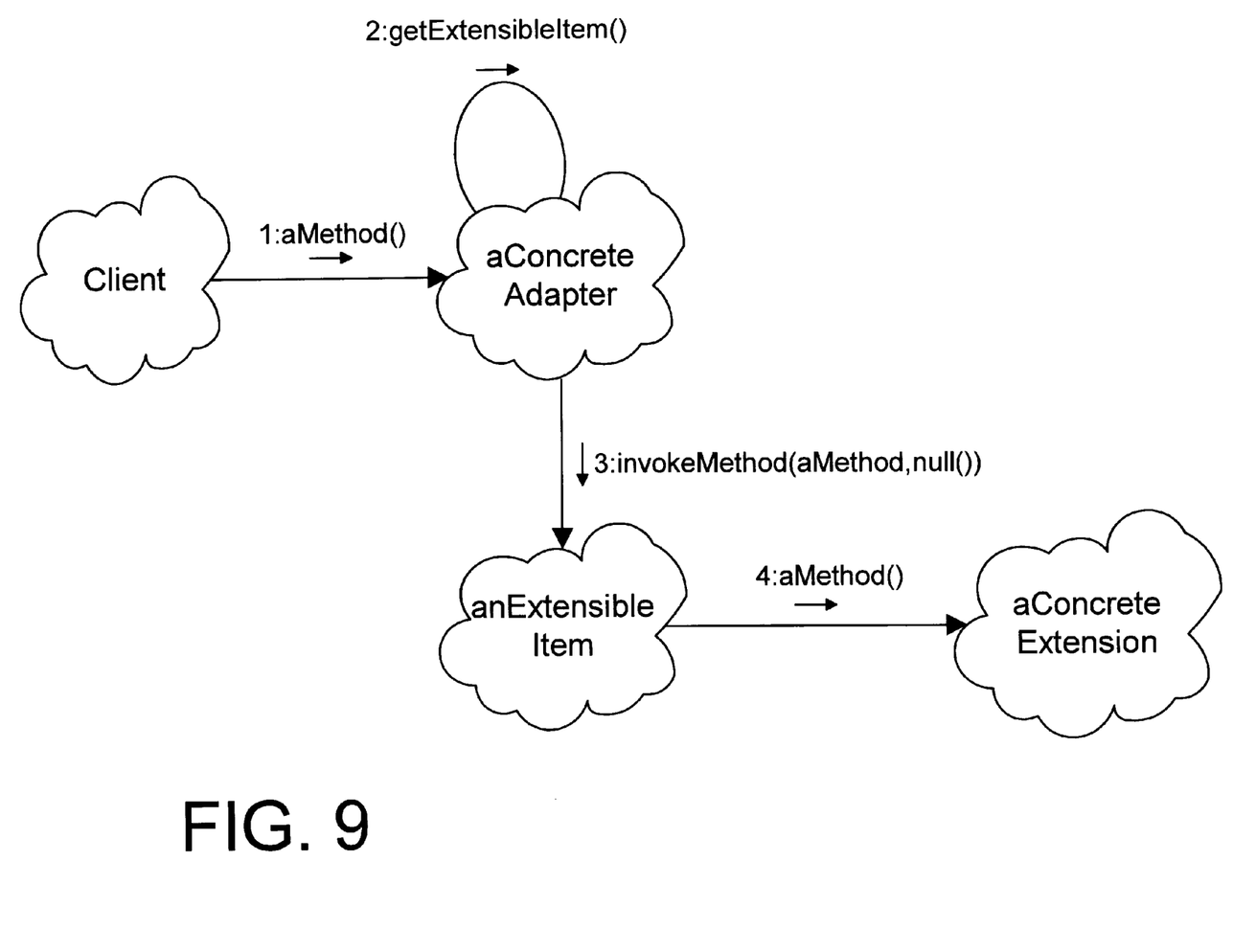
FIG. 9 is an object diagram showing steps for performing the method call on the adapter returned in step 7 of FIG. 8.

The class diagram of FIG. 7 may be better understood in conjunction with the object interaction diagrams of FIGS. 8 and 9. Referring to FIG. 8, we assume there exists a client program, represented by the Client object, that desires to invoke a selected method called aMethod( ) on the anExtensibleItem object. However, before doing so, anExtensibleItem needs to be cast to the appropriate class. So the Client object invokes the castTo( ) method on anExtensibleItem, passing the desired className as a parameter (step 1). The anExtensibleItem object then queries its extensions, looking for an extension that supports the className. The anExtensibleItem object first queries the object aConcreteExtension by calling the castTo( ) method, passing the className as a parameter (step 2). The aConcreteExtension object invokes its getAdapter( ) method (step 3) to determine if it has an adapter that corresponds to the className and to the anExtensibleItem object. The aConcreteExtension object tests its corresponding adapter to see if it supports the desired class by invoking the instanceOf( ) method on aConcreteAdapter (step 4), which returns aConcreteAdapter if it supports the className interface, and returns null otherwise. The appropriate concrete adapter or null is then returned by the aConcreteExtension object to the anExtensibleItem object (step 5). If a concrete adapter is returned in step 5, that adapter is returned in step 7, and the client program now knows which object supports the class-Name interface that defines the selected method call the client desires to invoke. However, if step 5 returns a null, indicating that the concrete extension's adapter does not support the className interface, each remaining Concrete-Extension objects, if any, are queried using the castTo( ) method of step 2, until either a concrete adapter object is returned, or a null is returned for all concrete extensions, indicating that the class is not supported by a concrete extension (step 6). This condition is generally an error condition, because any class that anExtensibleItem can be cast to should be supported by a corresponding extension and adapter under normal circumstances, although a specific implementation may could choose to use this information for other purposes. If an adapter object is located that supports the className, the object is returned to anExtensibleItem in step 5 and, in turn, returned to the Client program in step 7. If none of the extensions support the className interface, a null is returned in step 5 for each concrete extension, and a null is returned in step 7 to the client program, generally indicating an error. The normal flow of steps is that one of the concrete extensions will have a corresponding adapter object that supports the className, and the corresponding adapter object will be returned to the Client program in step 7.

Referring now to FIG. 9, once the Client program knows the concrete adapter object that corresponds to the anExtensibleItem object cast to the className, it invokes the selected method aMethod( ) on the concrete adapter (step 1). The aConcreteAdapter object then invokes its getExtensibleItem method (step 2) to determine which extensible item object corresponds to the adapter. Next, aConcrete-Adapter invokes the invokeMethod( ) method on the appropriate extensible item object, represented by anExtensibleItem. In response, the anExtensibleItem object calls aMethod( ) on the appropriate concrete extension (step 4), represented by aConcreteExtension. In this manner the ExtensibleItem object is cast to the desired class (className), and the method call aMethod( ) is delegated to a concrete extension that corresponds to the ExtensibleItem object and that supports the interface for the desired class.

The classes, objects and methods that support class casting for run-time extensible items in accordance with the present invention collectively comprise a means for providing class casting of run-time extensible items in an object oriented framework.

The present invention provides a way to support class casting for run-time extensible items in an object oriented framework. Known object oriented programming languages, such as C++ and Java, allow type casting for objects that statically inherit from other classes at compile-time. The present invention provides this same type of support for casting objects to particular classes when the objects are run-time extensible items.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   an object oriented framework mechanism residing in the memory, the object oriented framework mechanism including:
   at least one run-time extensible item object; and
   an object method defined on the run-time extensible item object that is invoked at run-time to cast the run-time extensible item object to a desired class.

2. The apparatus of claim 1 wherein each run-time extensible item object comprises at least one extension object that is added to the extensible item object at run-time and that may be deleted at run-time.

3. The apparatus of claim 1 wherein the object method for casting the extensible item object to a desired class is invoked when a selected object method defined by the desired class needs to be invoked on the extensible item object, the apparatus further comprising at least one adapter object corresponding to the extensible item object and corresponding to the desired class that defines the selected object method.

4. An apparatus comprising:
(1) at least one processor;
(2) a memory coupled to the at least one processor;
(3) an object oriented framework mechanism residing in the memory, the object oriented framework mechanism including:
   (A) an extensible item class that defines:
      (A1) at least one extensible item object;
      (A2) an object method that is invoked at run-time to cast the extensible item object to a desired class, wherein the object method for casting the extensible item object to a desired class is invoked when a selected object method defined by the desired class needs to be invoked on the extensible item object at run-time;
   (B) an abstract extension class that defines at least one extension object that is owned by the extensible item object, the abstract extension class further defining additional behavior for the extensible item object;
   (C) a concrete extension subclass of the extension class that implements the selected object method;
   (D) an abstract extensible item adapter class that defines at least one extensible item adapter object that corresponds to the extensible item object; and
   (E) a concrete adapter class that implements an interface for the desired class and that is a subclass of the abstract extensible item adapter class, the concrete adapter class defining at least one concrete adapter object.

5. An apparatus comprising:
a memory; and
an object oriented framework residing in the memory, the object oriented framework including an extensible item object and an object method defined on the extensible item object that is invoked at run-time to cast the extensible item object to a desired class.

6. A computer-implemented method for providing class casting support for a run-time extensible item object in an object oriented framework, the method comprising the steps of:
invoking a cast object method defined on the run-time extensible item object at run-time to cast the run-time extensible item object to a desired class when a selected object method defined by the desired class needs to be invoked on the extensible item;
locating an adapter object corresponding to the run-time extensible item object and corresponding to the desired class; and
invoking the selected object method on the adapter object.

7. A computer-implemented method for providing class casting support for a run-time extensible item object in an object oriented framework, the method comprising the steps of:
(A) providing an extensible item object that includes a cast object method that is invoked at run-time to cast the run-time extensible item object to a desired class when a client program needs to invoke a selected object method defined by the desired class on the extensible item object;
(B) providing at least one adapter object, each adapter object corresponding to the extensible item object and corresponding to the desired class;
(C) invoking the cast object method on the extensible item object at run-time;

(D)) determining if one of the at least one adapter object corresponds to the extensible item object and to the desired class;
(E) if a corresponding adapter object exists:
   the extensible item object returning the adapter object to the client program; and
   the client program invoking the selected method on the adapter object;
(F) if a corresponding adapter object does not exist:
   returning an error to the client program.

8. A computer-readable program product comprising:
an object oriented framework mechanism including at least one run-time extensible item object and an object method defined on the run-time extensible item object that is invoked at run-time to cast the run-time extensible item object to a desired class; and
signal bearing media bearing the object oriented framework mechanism.

9. The program product of claim 8 wherein the signal bearing media comprises recordable media.

10. The program product of claim 8 wherein the signal bearing media comprises transmission media.

11. The program product of claim 8 wherein each run-time extensible item object comprises at least one extension object that is added to the extensible item object at run-time and that may be deleted at run-time.

12. The program product of claim 8 wherein the object method for casting the extensible item object to a desired class is invoked when a selected object method defined by the desired class needs to be invoked on the extensible item object, the apparatus further comprising at least one adapter object corresponding to the extensible item object and corresponding to the desired class that defines the selection object method.

13. A computer-readable program product comprising:
(1) an object oriented framework mechanism including:
   (A) an extensible item class that defines:
      (A1) at least one extensible item object;
      (A2) an object method that is invoked at run-time to cast the extensible item object to a desired class, wherein the object method for casting the extensible item object to a desired class is invoked when a selected object method defined by the desired class needs to be invoked on the extensible item object;
   (B) an abstract extension class that defines at least one extension object that is owned by the extensible item object, the abstract extension class further defining additional behavior for the extensible item object;
   (C) a concrete extension subclass of the extension class that implements the selected object method;
   (D) an abstract extensible item adapter class that defines at least one extensible item adapter object that corresponds to the extensible item object; and
   (E) a concrete adapter class that implements an interface for the desired class and that is a subclass of the abstract extensible item adapter class, the concrete adapter class defining at least one concrete adapter object; and
(2) signal bearing media bearing the object oriented framework mechanism.

14. The program product of claim 13 wherein the signal bearing media comprises recordable media.

15. The program product of claim 13 wherein the signal bearing media comprises transmission media.

* * * * *